Nov. 20, 1951  L. J. ULRICH  2,575,695
BASE PLATE FOR CUTTING MACHINES
Filed Sept. 7, 1949

INVENTOR.
Lester J. Ulrich
BY
Parker, Crochmor & Turner,
Attorneys.

Patented Nov. 20, 1951

2,575,695

UNITED STATES PATENT OFFICE 2,575,695

BASE PLATE FOR CUTTING MACHINES

Lester J. Ulrich, Buffalo, N. Y., assignor to Eastman Machine Company, Buffalo, N. Y.

Application September 7, 1949, Serial No. 114,355

5 Claims. (Cl. 30—273)

This invention relates to improvements in cutting machines of the type commonly employed for cutting cloth and other sheet materials arranged in layers upon a supporting surface.

Cutting machines of this type include a base plate which is movable upon the surface on which the lay of material is supported, and this base slides under the material while the knife cuts through the same. Consequently, in lays of heavy material, the weight of the material resting on the base plate of the machine creates friction which makes it difficult for the operator to perform the cutting operation. This is particularly true with certain materials, such as rubber and plastic sheets, when piled up in plies to a considerable height. With materials of this type, a liquid is generally used as a lubricant to reduce the friction between the material and the base plate of the machine. Some materials, however, appear to wipe the lubricant from the upper surface of the base plate and also to adhere to the base plate by suction or other action, which makes it very difficult to move the base plate relatively to the material.

One of the objects of this invention is to provide a machine of this type with a base plate having portions of the upper surface thereof grooved or recessed in such a manner that the material being operated upon contacts with a reduced portion of the area of the upper surface of the base plate.

A further object is to provide a base plate for a machine of this type, the middle or material-engaging portion of which is so formed that only portions of the upper surface contact with the material which is being cut and in which other portions of the upper face of the base plate which normally do not contact with the material being cut, form wells or reservoirs for the lubricating liquid.

Other objects and advantages will be apparent from the following description of one embodiment of the invention and the novel features will be particularly pointed out hereinafter in connection with the appended claims.

Figure 1:
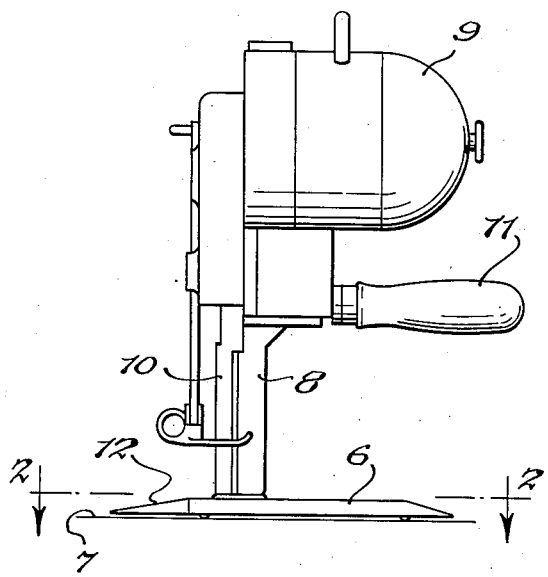
Fig. 1 is a side elevation of a cutting machine provided with a base plate embodying this invention.
Figure 2:
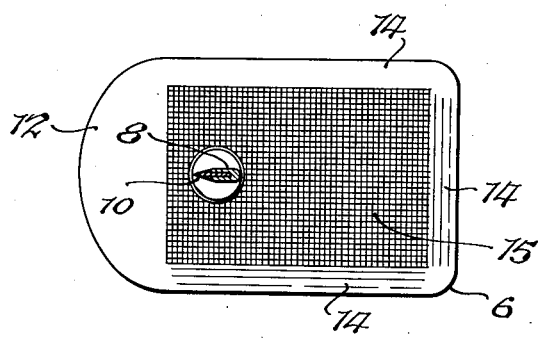
Fig. 2 is a sectional plan view thereof, on line 2—2, Fig. 1.
Figure 3:
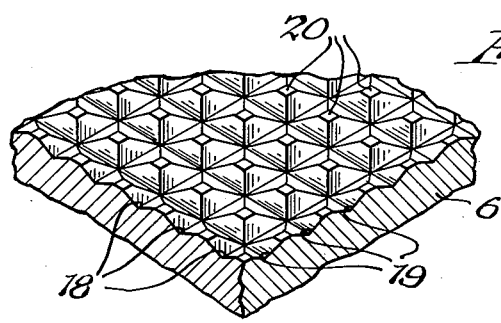
Fig. 3 is a fragmentary, enlarged, perspective view of a portion of the base plate of the machine.

In Fig. 1, I have illustrated by way of example one type of cutting machine on which my improvements may be used. This machine includes a base plate 6 which may be moved along a supporting surface 7, such as the top of a cutting table or the like. The base plate has the usual standard 8 secured on and rising from the base and supporting a motor 9 and suitable mechanism driven thereby which reciprocates a knife 10 which is guided for vertical movement in front of the standard. While I have illustrated my invention as used on a machine having a straight reciprocatory knife, it will be understood that this invention may also be used with machines having knives or cutting members of other types, such as circular rotary knives.

11 represents a handle by means of which the machine is manipulated for moving it along the surface 7 and for guiding the same according to the cut to be made.

The base plate 6 of the machine is provided at the front end thereof with a forwardly projecting and downwardly inclined part 12 which facilitates the insertion of the base plate between the supporting surface 7 and the lowermost sheet of the lay or stack of plies of the material to be cut. The sides and rear of the base plate are also provided with downwardly and outwardly inclined edge portions 14. All of these parts have been commonly used in connection with cutting machines of the type described and of themselves do not constitute part of this invention.

When the machine is in use, the middle portion 15 of the base plate, in other words, the portion thereof which terminates at the inner edges of the inclined surfaces 12 and 14, receives the greatest pressure due to the weight of that portion of the material which is supported by or raised above the supporting table 7 by the base during the cutting of the material. Heretofore the upper surface of the middle portion 15 of the base has been made smooth, level and polished with the idea of sliding readily under the lay of material. When the material which is being cut is woven textile material, and the lay is not particularly high, a base plate with a polished upper middle portion may be readily used without fatiguing the operator. However, when the machine is used for cutting through heavy lays of material having surfaces which offer high frictional resistance to the movement of the base plate, then the polished base plates heretofore used are not satisfactory, because of the force required to push the machine along the supporting surface. Even when lubricating fluids have been used on base plates of this type, the resistance to the movement of the base plate under the lay of the material has not been sufficiently reduced.

I have found that by providing the upper middle portion of the base plate with a large number of grooves, recesses or depressions into which the material of the lay does not enter during the use of the machine, a material reduction in the resistance to the movement of the base plate under the material results, so that the operator can perform the cutting operation with materially less physical effort. The grooves or recesses in the upper surface of the middle portion of the base plate are preferably arranged in such a manner as to intersect each other, and thus form a plurality of upper, flat, material-supporting surfaces separated from each other by the grooves or depressions. For example, in the drawings, I show the middle portion of the base plate provided with shallow wide-angled grooves or recesses 18 and 19 of approximately V-shape, the grooves 18 intersecting the grooves 19 at substantially right angles and thus forming a plurality of pyramids with flat tops 20. These flat tops support most of the weight of the material being cut, and since the grooves are wide-angled, the junctures of the upper ends of the grooves with the tops 20 will form dull edges having no tendency to cut into the material to be cut. These grooves, consequently, form wells or reservoirs for a liquid lubricant, which, because of the motion and vibrations of the machine while cutting, will be splashed upon the flat load supporting surfaces 29 and on the under surface of the material. Since these surfaces 20 are small in comparison with the total area of the middle portion 15 of the base plate, any tendency of the material to adhere to the base plate by suction will be greatly reduced.

It will be understood that various changes in the details, materials, and arrangements of parts which have been herein described and illustrated in order to explain the nature of the invention, may be made by those skilled in the art within the principle and scope of the invention, as expressed in the appended claims.

I claim as my invention:

1. A base plate for a cutting machine formed to move on a supporting surface and to extend under a lay of material to be cut and from which a narrow standard rises which supports the operating parts of the machine, said base plate having downwardly and outwardly inclined edge portions and a middle portion which contact with and move relatively to the material being cut, said middle portion of the base plate being provided on the upper face thereof with shallow wide-angled recesses which are spaced apart to form between them substantially flat surfaces of reduced areas on said upper face which contact with the material.

2. A base plate for a cutting machine according to claim 1, in which said recesses extend in different directions and intersect each other.

3. A base plate for a cutting machine formed to move on a supporting surface and to extend under a lay of material to be cut and from which a narrow standard rises which supports the operating parts of the machine, said base plate having downwardly and outwardly inclined edge portions and a middle portion which contact with and move relatively to the material being cut, said middle portion of the base plate being provided on the upper face thereof with a series of shallow pyramidal projections with gradually sloping sides having their upper ends flattened to contact with the material to be cut, said projections being spaced from each other.

4. A base plate for a cutting machine formed to move on a supporting surface and to extend under a lay of material to be cut and from which a narrow standard rises which supports the operating parts of the machine, said base plate having downwardly and outwardly inclined edge portions and a middle portion which contact with and move relatively to the material being cut, said middle portion of the base plate being provided on the upper face thereof with a series of shallow pyramidal projections with their sides extending at acute angles from their upper ends and having their upper ends flattened to contact with the material to be cut, and depressions in said upper face formed by the sides of said projections and forming reservoirs to retain lubricant for facilitating the sliding of said base plate under said material.

5. A base plate for a cutting machine formed to move on a supporting surface and to extend under a lay of material to be cut and from which a narrow standard rises which supports the operating parts of the machine, said base plate having that portion of the upper surface thereof which slides relatively to the material being cut provided with a plurality of wide-angled V-shaped grooves extending substantially at right angles to each other and forming pyramidal projections having substantially flat upper surfaces on which the material to be cut rests, said grooves forming reservoirs for lubricant for said material and said flat surfaces.

LESTER J. ULRICH.

REFERENCES CITED

The following references are of record in the file of this patent:

UNITED STATES PATENTS

| Number | Name | Date |
|---|---|---|
| 1,889,897 | Johansson | Dec. 6, 1932 |
| 1,946,432 | Aldeborgh | Feb. 6, 1934 |
| 2,192,937 | Shepard | Mar. 12, 1940 |
| 2,462,317 | Green | Feb. 22, 1949 |

FOREIGN PATENTS

| Number | Country | Date |
|---|---|---|
| 53,381 | Sweden | Nov. 23, 1922 |